June 4, 1935.　　　　L. K. LA PAN　　　2,003,893
FISHING ROD
Filed Sept. 27, 1934　　　2 Sheets-Sheet 1
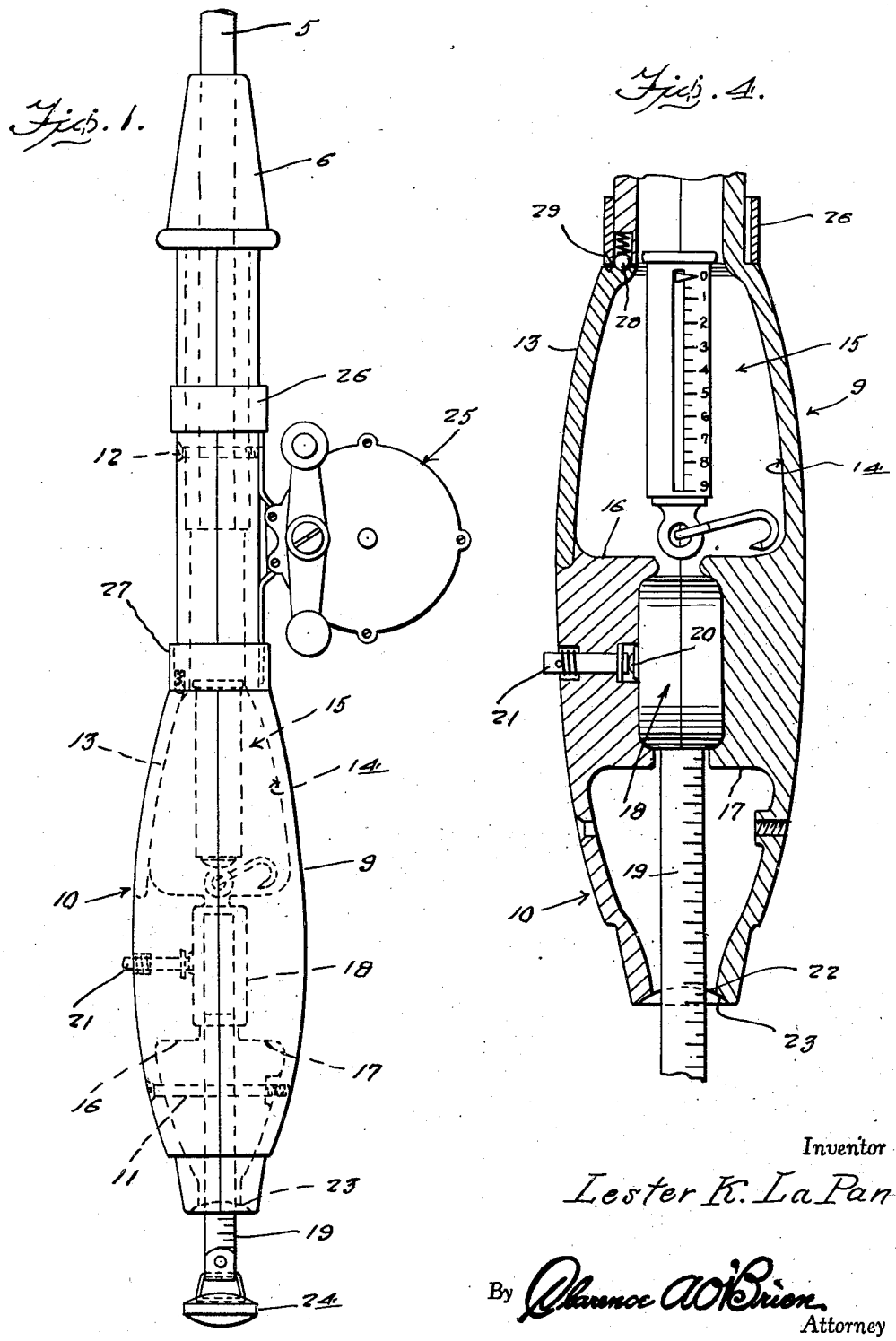
Inventor
Lester K. La Pan
By Clarence A. O'Brien
Attorney June 4, 1935.　　　　　　L. K. LA PAN　　　　　2,003,893
FISHING ROD
Filed Sept. 27, 1934　　　2 Sheets-Sheet 2
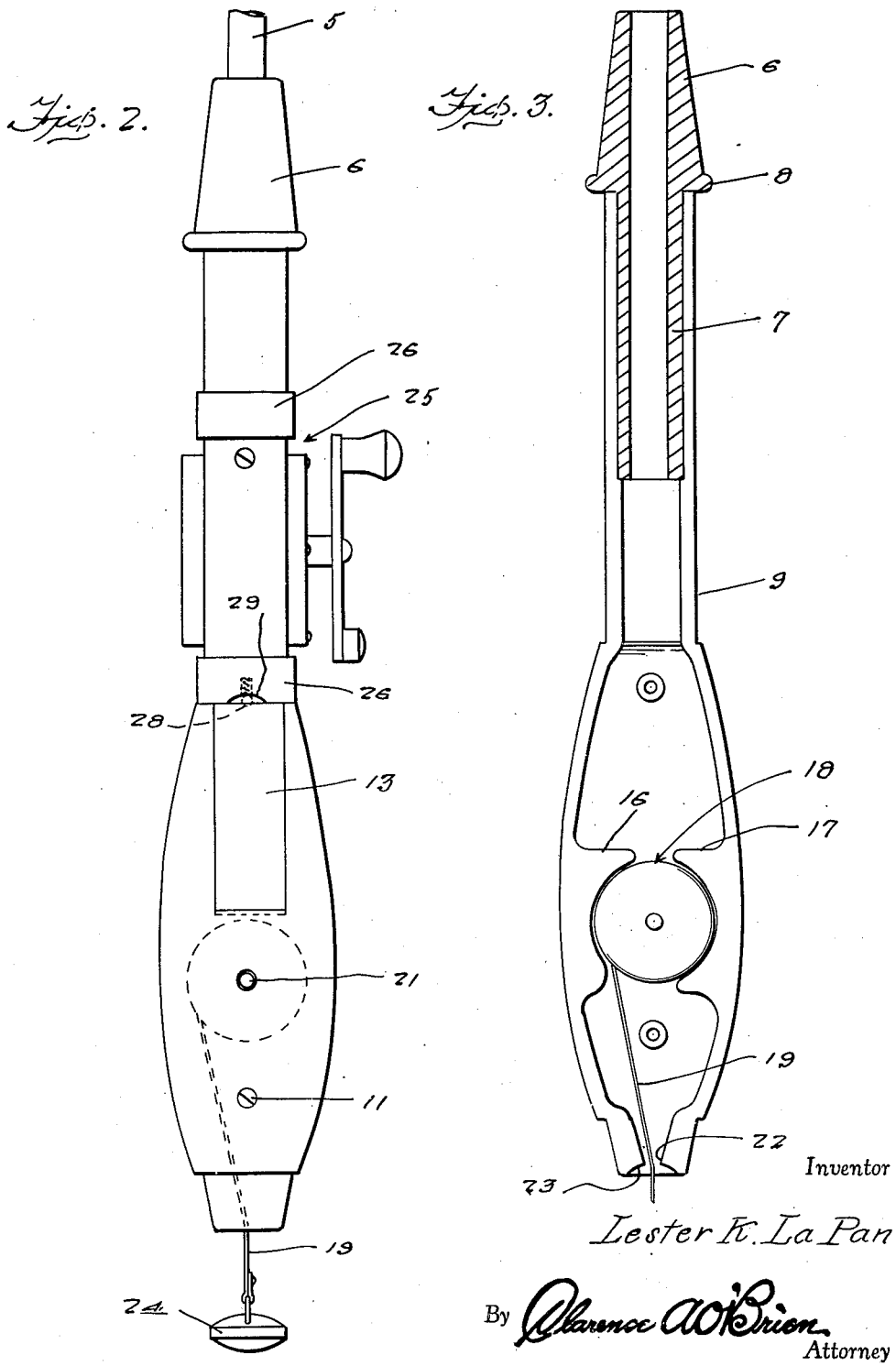
Inventor
Lester K. La Pan
By Clarence A. O'Brien
Attorney Patented June 4, 1935

2,003,893

UNITED STATES PATENT OFFICE 2,003,893

FISHING ROD

Lester K. La Pan, Glens Falls, N. Y.

Application September 27, 1934, Serial No. 745,783

5 Claims. (Cl. 43—23)

This invention relates to an improved fishing rod and has more particular reference to the specific construction of the hand grip, which, in the present instance, is so made as to accommodate accessories capable of use for the convenience of fishermen.

One purpose of the invention is to provide a measuring tape such as may be conveniently used to measure the length of the fish caught so as to enable the user to determine when the fish is too small for usage.

Specifically and structurally stated, novelty is predicated upon a two-piece hand-grip construction wherein the pieces or sections are so cast or formed as to provide a novel and dependable mounting for the casing which contains the measuring tape, said sections being further constructed to facilitate withdrawal of the tape and to insure return thereof to an out of the way position when it is not in use.

A further feature of the invention is predicated upon a double-section hand-grip construction wherein such sections are made to define a hollow chamber intended to contain a miniature weighing scale, said compartment being accessible through the instrumentality of a quick removable cover plate so as to enable the scale to be utilized for weighing fish at the time of making the catch.

Other features and advantages will become more readily apparent from the following description and drawings.

In the drawings:

Figure 1 is an elevational view of a fishing rod hand-grip constructed in accordance with the principles of the present invention showing the essential internal details in dotted lines.

Figure 2 is a view taken at right angle to Figure 1 showing the cover plate permitting access to be had to the weighing scale compartment.

Figure 3 is a view partly in section and elevation showing the elevational construction of one of the companion or complemental sections of the two-part hand-grip.

Figure 4 is a view in section and elevation showing the accessories and their particular association with the complemental sections which go to make up the complete hand-grip.

Referring now to the drawings by distinguishing reference numerals and especially to Figure 1, it will be observed that the shaft or staff of the fishing rod is denoted by the numeral 5 and that it is provided with an attaching fixture which may be conveniently referred to as a ferrule. This includes a thimble 6 having a tubular shank 7 the shank being reduced in diameter so as to form a shoulder at 8. It is against this shoulder that the sleeve portion of the hand grip, as a unit, fits in the manner shown in the drawings. The hand grip is of two-part construction, that is, made up of duplicate sections which sections are denoted by the numerals 9 and 10 respectively. These are of such companion formation as to allow them to fit together in suitably matched relationship. Screws or similar fastenings 11 and 12 serve to secure the sections together in hand-grip forming relationship. Considering the hand grip as a unit, it may be said to include a sleeve which fits over the shank 7 and an elongated bulbous shaped portion which forms the hand grip per se. The portions which go to make up this bulbous shaped portion from a hollow enclosure when brought together in the manner depicted in Figure 4. The section 10 is provided with an opening fashioned to accommodate a removable cover plate 13 which is arranged and fashioned to define a compartment or chamber 14 for one of the accessories. The accessory in this instance is in the nature of a simple spring scale 15 which may be removed through the door or opening so that it can be employed for weighing fish. In connection with this scale accommodation compartment, it might be pointed out that this is partially defined by the inwardly protruding opposed projections 16 and 17. These projections are somewhat circular in cross sectional shape and come together in close spaced relation with the adjacent faces provided with recesses to provide a receptacle or holder for the second accessory. In other words, the projections 16 and 17 definite the bottom of the compartment 14 and also serve as elements to accommodate and hold a part of a measuring tape in place. The particular part referred to is the casing or housing 18 which contains the calibrated tape 19. This measuring tape may be of conventional form and is provided on one side with an actuating button 20 which is operated through the instrumentality of a spring pressed push pin 21 slidably mounted in the projection 16. This push pin extends to the exterior while the inner end thereof engages the button 20. It is the means for releasing the spring drum (not shown) in the casing for winding or reeling the tape. The outer end of the tape when in use is drawn through a slot 22 adjacent to which is a concavity 23 forming a seat for a double convex head 24 on the free end of the tape. This head when seated provides a closure for the slot 22 as well as a finger grip for pulling the tape out for use when it is desired to measure the length of a fish. The purpose of the tape is to allow fishermen to measure small fish in particular so that if they are too small or in catching them would violate the law, he may throw them back into the water. The tape, however, can also be used for measuring larger fish which is sometimes desirable when members of a fishing party have a friendly wager on the largest or the longest fish caught. When, however, it is desired to determine the size of the fish more especially by weight, the spring weighing scale 15 is employed. It follows, therefore, that the bulbous shaped portion of the hand grip is of hollow construction and internally made to accommodate two accessories, that is, a measuring tape and its operating means, and a miniature spring weighing scale.

I may mention that the numeral 25 designates a conventional reel held in place by rings 26 and 27. The ring 27 serves as a collar and also as a retainer for a spring pressed ball latch 28 of the type shown in Figure 4. This latch serves to hold the cover plate 13 in position. The numeral 29 merely designates a finger niche to facilitate opening the cover plate.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

1. A hand grip for fishing rods comprising an elongated hollow bulbous-shaped member provided on its interior with opposed projections fashioned to provide supporting and retaining means, a measuring reel casing supported in said retaining means and including a measuring tape, said measuring tape being arranged for access and operation through a slot in one end of said member.

2. A hand grip for fishing rods comprising an elongated hollow bulbous-shaped member provided on its interior with opposed projections fashioned to provide supporting and retaining means, a measuring reel casing supported in said retaining means and including a measuring tape, said measuring tape being arranged for access and operation through a slot in one end of said member, said one end of the member being formed with a concavity defining a seat, and a head on the outer end of said tape cooperable with said seat, said head serving as a finger grip.

3. A hand grip attachment for a fishing rod assembly of the class described including an attaching sleeve and an elongated bulbous-shaped hand grip, said hand grip being hollow, formed at its outer end with a tape guide slot and an adjacent retaining seat, and provided on its interior with a pair of disk-like projections arranged in opposed relation with their meeting faces having depressions defining a holder, a measuring tape comprising a casing mounted in said holder, the tape having its outer end extending through said slot and provided on its extremity with a head forming a finger grip and seatable in said seat, the casing portion of said measuring tape having a latch button, and a spring returned operating pin for said button slidably mounted in one of the projections, the outer end of said pin being located on the exterior of said hand grip to render it accessible for convenient actuation.

4. As a new article of manufacture, a detachable hand grip for a fishing rod and reel assemblage comprising a structure including a pair of substantially duplicate companion sections adapted to be bolted together in operative relationship, said structure including an attaching sleeve and a bulbous-shaped hand grip per se, a portion of said hand grip having a hand opening and a cover therefor together with retaining means for said cover plate, said bulbous-shaped portion also being provided on its interior with a pair of opposed projections defining a holder for the casing portion of a measuring tape.

5. A hand grip for a fishing rod assembly comprising a hollow bulbous shaped body provided on its interior with a pair of duplicate companion opposed projections formed in their opposed faces with depressions, a measuring tape casing clamped on the interior of said body between said projections, said casing being seated in said depressions, said projections in conjunction with said casing being located centrally with respect to the longitudinal dimension of the body and serving to provide a pair of spaced individual compartments, one of said compartments being fashioned to serve as a holder for a fish weighing scale, and the wall of said compartment being provided with a hand hole and a removable latch retained covering plate for said hand hole.

LESTER K. LA PAN.